United States Patent Office 3,227,705
Patented Jan. 4, 1966

3,227,705
COPPER CONTAINING DISAZO DYESTUFFS
Ronald Baker and Ian Durham Rattee, Manchester, England, assignors to Imperial Chemical Industries Limited, Millbank, London, England, a corporation of Great Britain
No Drawing. Filed Jan. 18, 1963, Ser. No. 252,291
Claims priority, application Great Britain, Jan. 30, 1962,
3,472/62
4 Claims. (Cl. 260—148)

This invention relates to new azo dyestuffs, and more particularly it relates to new copper-containing azo dyestuffs which are valuable for colouring textile materials, in particular cellulose textile materials.

According to the invention there are provided the copper-containing azo dyestuffs which, in the form of the free acids, are represented by the formula:

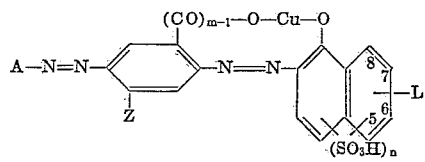

wherein A represents a sulphophenyl or sulphonaphthyl radical, Z represents a hydrogen atom or a methyl radical, $n$ and $m$ each independently represent 1 or 2, and L, which is attached to the 6-, 7- or 8-position of the naphthalene nucleus, represents a group of the formula:

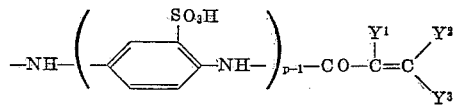

wherein $Y^1$, $Y^2$ and $Y^3$ each independently represent a hydrogen or a chlorine atom, and $p$ represents 1 or 2.

It is however preferred that $Y^1$, $Y^2$ and $Y^3$ each represent a hydrogen atom.

As examples of the sulphophenyl radicals represented by A there may be mentioned 2-, 3- or 4-sulphophenyl and 2:5-, 3:5- or 2:4-disulphophenyl radicals; and as examples of the sulphonaphthyl radicals represented by A there may be mentioned 1-sulphonaphth-2-yl, 1:5-, 3:6-, 4:8- or 5:7-disulpho-naphth-2-yl, 4-, 5- or 6-sulphonaphth-1-yl and 6- or 8-sulphonaphth-2-yl radicals.

According to a further feature of the invention there is provided a process for the manufacture of the copper-containing azo dyestuffs, as hereinbefore defined, which comprises treating an azo compound which, in the form of the free acid, is represented by the formula:

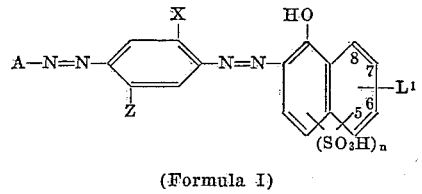

(Formula I)

wherein A, Z and $n$ have the meanings stated, X represents a methoxy, hydroxy or carboxylic acid group, and $L^1$ which is attached to the 6-, 7- or 8-position of the naphthalene nucleus represents a group of the formula:

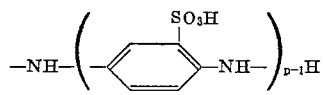

wherein $p$ represents 1 or 2, with a coppering agent and with an acylating agent derived from an acid of the formula:

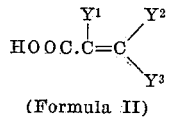

(Formula II)

In carrying out the process of the invention the azo compound of Formula I can either be treated with the coppering agent and the resulting copper-containing azo compound of the formula:

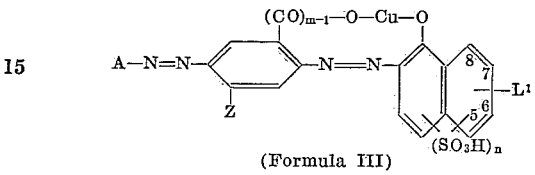

(Formula III)

wherein A, Z, $L^1$, $m$ and $n$ have the meanings stated, treated with the acid acylating agent; or the azo compound of Formula I can be treated with the said acylating agent to give an azo compound of the formula:

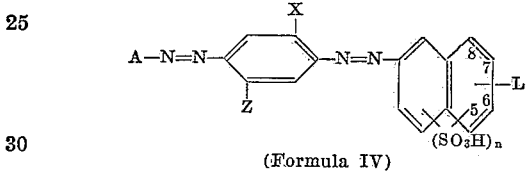

(Formula IV)

wherein A, L, X, Z and $n$ have the meanings stated, which is subsequently treated with the coppering agent.

The treatment of the azo compounds of Formula I or Formula IV with the coppering agent can be conveniently carried out by heating an aqueous solution containing the azo compound and the coppering agent; the copper-complexes so obtained can then be isolated by conventional methods.

As examples of coppering agents there may be mentioned copper sulphate, copper acetate and cuprammonium sulphate.

The treatment of the azo compound of Formula I or of the copper-containing azo compound of Formula III with the said acylating agent can be conveniently brought about by adding the acylating agent to an aqueous solution of the said azo compound or of the said copper-containing azo compound, stirring the resulting mixture, preferably at a temperature between 0° and 20° C., and if desired maintaining the pH of the mixture between 5.0 and 7.0 by the addition of an acid-binding agent such as sodium carbonate. The resulting acyl derivative can then be isolated by conventional methods.

As examples of the said acylating agents there may be mentioned α- or β-chloro-acryloyl chloride, α:β:β-trichloroacryloyl chloride and, above all, acryloyl chloride.

The azo compounds of Formula I may themselves be obtained by diazotising an amine of the formula: A—NH$_2$, wherein A has the meaning stated, coupling the resulting diazo compound with a para-coupling amine of the formula:

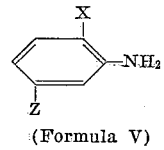

(Formula V)

wherein X and Z have the meanings stated, or with the corresponding N-methane-ω-sulphonate, if necessary hydrolysing off the N-methane-ω-sulphonate group, re-diazotising and coupling with an aminonaphthol of the formula:

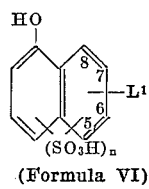

(Formula VI)

wherein L¹ and $n$ have the meanings stated.

As examples of the amines of the formula: A—NH$_2$, there may be mentioned aniline-2-, 3- or 4-sulphonic acid, aniline-2:4-, 2:5- or 3:5-disulphonic acid, 1-naphthylamine-4-, 5-, 6- or 7-sulphonic acid, 2-naphthylamine-1-, 6- or 8-sulphonic acid, 2-naphthylamine-1:5-, 3:6-, 4:8-, 5:7- or 6:8-disulphonic acid and 2-naphthylamine-1:5:7-trisulphonic acid.

As examples of the para-coupling amines of Formula V there may be mentioned anthranilic acid, 2-anisidine and 2-methoxy-5-methylaniline.

As examples of the aminonaphthols of Formula VI there may be mentioned 6-amino-1-naphthol-3:5-disulphonic acid, 7-amino-1-naphthol-3:6-disulphonic acid, 6-(4'-amino-3'-sulphophenylamino)-1-naphthol - 3:5-disulphonic acid, 7-(4'-amino-3'-sulphophenylamino)-1-naphthol-3:6-disulphonic acid, 8-amino-1-naphthol-3:6-disulphonic acid, 8-amino-1-naphthol-3:5-disulphonic acid, 8-amino-1-naphthol-5-sulphonic acid, 7-amino-1-naphthol-3-sulphonic acid, 6-amino-1-naphthol-3-sulphonic acid, 8-(4'-amino-3'-sulphophenylamino)-1-naphthol - 3:6 - disulphonic acid, 7-(4'-amino-3'-sulphophenylamino)-1-naphthol-3-sulphonic acid and 6-(4'-amino-3'-sulphophenylamino)-1-naphthol-3-sulphonic acid.

Alternatively the azo compounds of Formula IV can be obtained by coupling a diazotised amine of the formula: A—NH$_2$ with a para-coupling amine of Formula V, rediazotising and coupling with an acylated aminonaphthol of the formula:

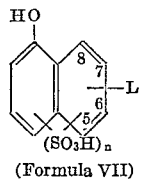

(Formula VII)

wherein L and $n$ have the meanings stated.

As examples of the said acylated aminonaphthols of Formula VII there may be mentioned 6-acryloylamino-1-naphthol-3-sulphonic acid, 8 - acryloylamino-1-naphthol-3:6-disulphonic acid and 7-acryloylamino-1-naphthol-3-sulphonic acid.

One preferred class of the copper-containing azo dyestuffs of the invention are the dyestuffs which, in the form of the free acids, are represented by the formula:

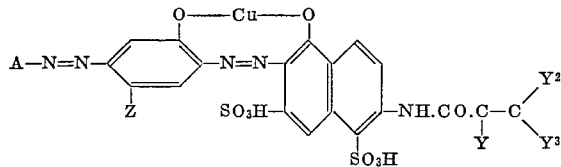

wherein A, Z, Y¹, Y² and Y³ have the meanings stated.

A second preferred class of the copper-containing azo dyestuffs of the invention are the dyestuffs which, in the form of the free acids, are represented by the formula:

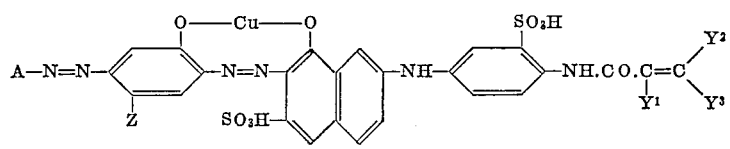

wherein A, Z, Y¹, Y² and Y³ have the meanings stated.

In these preferred classes it is further preferred that Y¹, Y² and Y³ each represent hydrogen atoms.

The copper-containing azo dyestuffs of the invention are valuable for colouring natural and artificial textile materials for example textile materials comprising cotton, viscose rayon, regenerated cellulose, wool, silk, polyamides and modified polyarcylonitrile fibres. For this purpose the dyestuffs can be applied to the textile materials by dyeing, padding or printing using in the latter case printing pastes containing the conventional thickening agents or oil-in-water emulsions or water-in-oil emulsions, whereby the textile materials are coloured in a wide variety of shades possessing excellent fastness to washing, perspiration, hypochlorite bleach (fastness to chlorine), acid treatments and to light. The said dyestuffs also build-up well on textile materials to give heavy depths of shade.

The copper-containing azo dyestuffs are particularly valuable as "reactive" dyestuffs for colouring cellulose textile materials. For this purpose the dyestuffs are preferably applied to the cellulose textile material in conjunction with a treatment with an alkaline agent, for example sodium carbonate or bicarbonate, sodium metasilicate, trisodium phosphate or sodium hydroxide which may be applied to the cellulose textile material before, during or after the application of the dyestuff. Alternatively when the dyed textile material is subsequently heated or steamed a substance such as sodium trichloroacetate, which becomes alkaline on heating or steaming, can be used.

The copper-containing azo dyestuffs of the invention can also be used for colouring nitrogen-containing textile materials, for example polyamide textile materials but, more particularly, woolen textile materials.

The copper-containing azo dyestuffs of the invention can be applied to nitrogen-containing textile materials from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

When so applied to woollen textile materials the dyestuffs possess good fastness to washing, milling, wet heat setting treatments and to light.

The invention is illustrated but not limited by the following examples in which the parts and percentages are by weight.

*Example 1*

Diazotised aniline-2:5-disulphonic acid is coupled with 2-methoxy-5-methylaniline, the aminoazo compound so obtained is diabotised and coupled under alkaline conditions with an equimolecular proportion of 6-amino-1-naphthol-3:5-disulphonic acid and the aminodisazo compound so obtained is converted to its copper complex by heating it for 20 hours at a temperature between 95° and 100° C. with an aqueous solution of cuprammonium sulphate.

A solution of 86.7 parts of the tetra-sodium salt of the copper-containing aminodisazo compound so obtained in 1500 parts of water is cooled to a temperature between 0° and 5° C. 45 parts of acaryloyl chloride are then gradually added over 2¾ hours while a concentrated aqueous solution of sodium carbonate is simultaneously added to maintain the pH of the resulting mixture between 5.5 and 6.5. The mixture is then stirred for 18 hours at 20° C., 170 parts of sodium chloride are added and the copper-containing azo dyestuff is filtered off and dried.

When applied to cellulose textile materials in conjunc-

The following table gives further examples of copper-containing azo dyestuffs of the invention which are obtained when the azo compounds, which are themselves obtained by diazotising the amines listed in the second column of the table, coupling with the para-coupling amines listed in the third column of the table, rediazotising and coupling with the aminonaphthols listed in the fourth column of the table, are treated with a coppering agent and with the acylating agents listed in the fifth column of the table by methods similar to those described in Example 1. The sixth column of the table indicates the shades obtained when the said dyestuffs are applied to cellulose textile materials in conjunction with a treatment with an acid-binding agent.

| Example | Amine | Para-coupling amine | Aminonaphthol | Acylating agent | Shade |
|---|---|---|---|---|---|
| 4 | Aniline-2:5-disulphonic acid | 2-methoxy-5-methylaniline | 6-amino-1-naphthol-3:5-disulphonic acid. | β-Chloroacryloyl chloride | Blue. |
| 5 | ___do___ | ___do___ | ___do___ | α:β:β-Trichloroacryloyl chloride. | Do. |
| 6 | ___do___ | ___do___ | 7-(4'-amino-3'-sulphophenylamino)-1-naphthol-3-sulphonic acid. | Acryloyl bromide | Grey. |
| 7 | ___do___ | ___do___ | ___do___ | α-Chloroacryloyl chloride | Do. |
| 8 | Orthanilic acid | ___do___ | 8-amino-1-naphthol-3:6-disulphonic acid. | Acryloyl chloride | Blue. | tion with a treatment with an acid-binding agent the dyestuff yields blue shades possessing excellent fastness to wet treatments such as mild or severe washing, acid or alkali spotting, perspiration, and to light.

*Example 2*

In place of the 86.7 parts of the tetra-sodium salt of the copper-containing aminodisazo compound used in Example 1 there are used 95.75 parts of the tetra-sodium salt of the copper-containing aminodisazo compound obtained by coupling diazotised aniline-2:5-disulphonic acid with 2-methoxy-5-methylaniline, rediazotising, coupling with 7-(4'-amino-3'-sulphophenylamino) - 1 - naphthol-3-sulphonic acid under alkaline conditions and finally treating the resulting aminodisazo compound with an aqueous solution of cuprammonium sulphate.

The copper-containing azo dyestuff so obtained, when applied to cellulose textile materials in conjunction with a treatment with an acid-binding agent, yields grey shades possessing very good fastness to washing.

*Example 3*

Diazotised 2-aminonaphthalene-4:8-disulphonic acid is coupled with the disodium salt of the N-methane ω-sulphonate of 2-aminobenzoic acid in aqueous medium at a pH of 6.5, the resulting compound is heated with an aqueous solution of sodium hydroxide to hydrolyse off the N-methane ω-sulphonate group, the resulting aminoazo compound is diazotised and coupled with 6-acryloylamino-1-naphthol-3-sulphonic acid in aqueous alkaline medium.

A mixture of 84.3 parts of the tetrasodium salt of the so-obtained disazo compound, 2000 parts of water, 27.4 parts of crystalline copper sulphate and 27.2 parts of crystalline sodium acetate is stirred for 2 hours at a temperature between 70° and 75° C. The mixture is then cooled to 20° C., and the dyestuff which is precipitated is filtered off and dried.

When applied to cellulose textile materials in conjunction with a treatment with an acid-binding agent the dyestuff yields bluish-red shades which possess excellent fastness to washing.

What we claim is:
1. The copper-containing azo dyestuff of the formula:

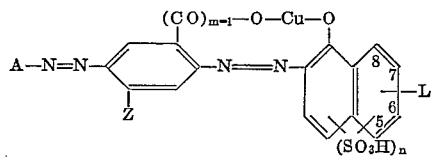

wherein
A represents a radical selected from the class consisting of sulphophenyl and sulphonaphthyl radicals;
and L, which is attached to one of the 6-, 7- and 8-positions of the naphthalene nucleus, represents a group of the formula:

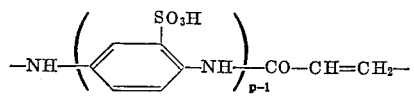

and $p$ represents a positive integer not exceeding 2,
Z represents a member selected from the class consisting of hydrogen and methyl, provided that when $m$ is 2, Z is hydrogen;
$n$ and $m$ each independently represent a positive integer not exceeding 2.

2. The copper-containing azo dyestuff of the formula:

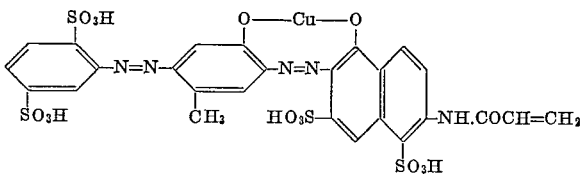

3. The copper-containing azo dyestuff of the formula:

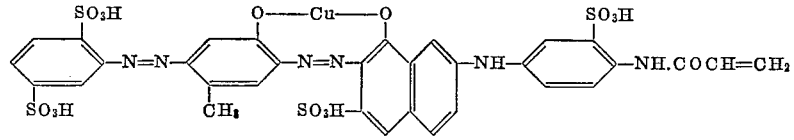

4. The copper-containing azo dyestuff of the formula:
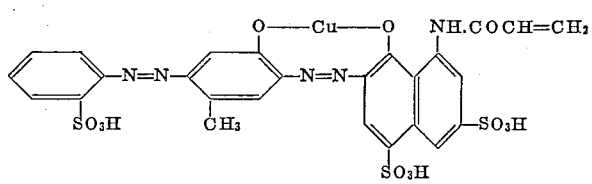
References Cited by the Examiner
UNITED STATES PATENTS
| | | | |
|---|---|---|---|
| 3,038,893 | 6/1962 | Andrew | 260—153 |
| 3,057,673 | 10/1962 | Mills et al. | 260—153 X |
| 3,057,844 | 10/1962 | Andrew et al. | 260—148 X |
| 3,057,846 | 10/1962 | Andrew et al. | 260—148 |
| 3,133,909 | 5/1964 | Riat | 260—194 X |
OTHER REFERENCES
Wegmann, J.: Textil-Praxis, October 1958, pp. 1056–1061.
CHARLES B. PARKER, *Primary Examiner.*